US007970031B2

(12) United States Patent
Williams et al.

(10) Patent No.: US 7,970,031 B2
(45) Date of Patent: Jun. 28, 2011

(54) Q-SWITCHED LASER WITH PASSIVE DISCHARGE ASSEMBLY

(75) Inventors: William E. Williams, Melbourne, FL (US); Charles Carter, Orlando, FL (US); Robert Pollard, Orlando, FL (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 12/616,527

(22) Filed: Nov. 11, 2009

(65) Prior Publication Data

US 2011/0110386 A1 May 12, 2011

(51) Int. Cl.
*H01S 3/11* (2006.01)
*H01S 3/00* (2006.01)
(52) U.S. Cl. .................. 372/38.05; 372/10
(58) Field of Classification Search ............. 372/10, 372/12, 38.05
See application file for complete search history.

(56) References Cited

U.S. PATENT DOCUMENTS

| 3,611,182 | A | * | 10/1971 | Treacy ................... 372/15 |
| 3,965,439 | A | | 6/1976 | Firester |
| 4,669,085 | A | | 5/1987 | Plourde |
| 4,884,044 | A | * | 11/1989 | Heywood et al. ......... 359/245 |
| 5,384,515 | A | * | 1/1995 | Head et al. .............. 313/607 |
| RE35,240 | E | | 5/1996 | Heywood et al. |
| 5,905,746 | A | | 5/1999 | Nguyen et al. |
| 6,501,772 | B1 | | 12/2002 | Peterson |

* cited by examiner

*Primary Examiner* — Armando Rodriguez
(74) *Attorney, Agent, or Firm* — The H.T. Than Law Group

(57) ABSTRACT

Embodiments of the invention concern a passive discharge assembly comprising one or more substantially sharp electrode pins that are positioned proximate to a charged, insulating surface, such as the optical entrance and exit surface of a Q-switch crystal, e.g., lithium niobate ($LiNbO_3$). The electrode pins are connected either to the ground or, alternatively, to a static source of neutralizing charge. The purpose of the electrodes is to ionize the air near the tips due to the high electric field generated by the surface charge. The air ions, in turn, neutralize the surface charge as they are attracted to the surface due to the electrical attraction. In the absence of a surface charge, no air ionization occurs. In one embodiment, the electrode pins are located near the Q-switch crystal surface, but outside the path of the laser beam propagating into and out of the Q-switch crystal.

19 Claims, 7 Drawing Sheets

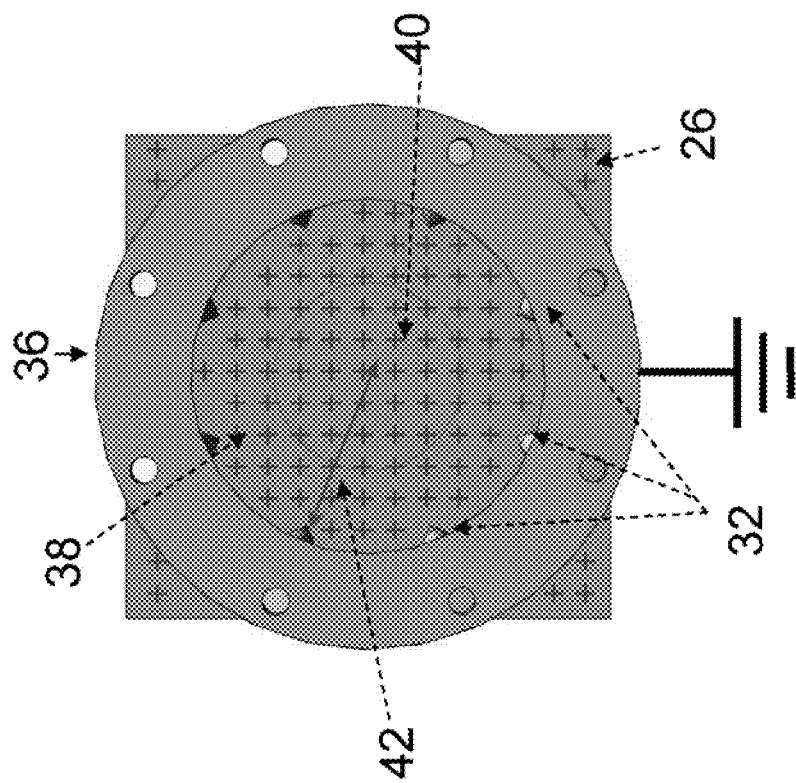
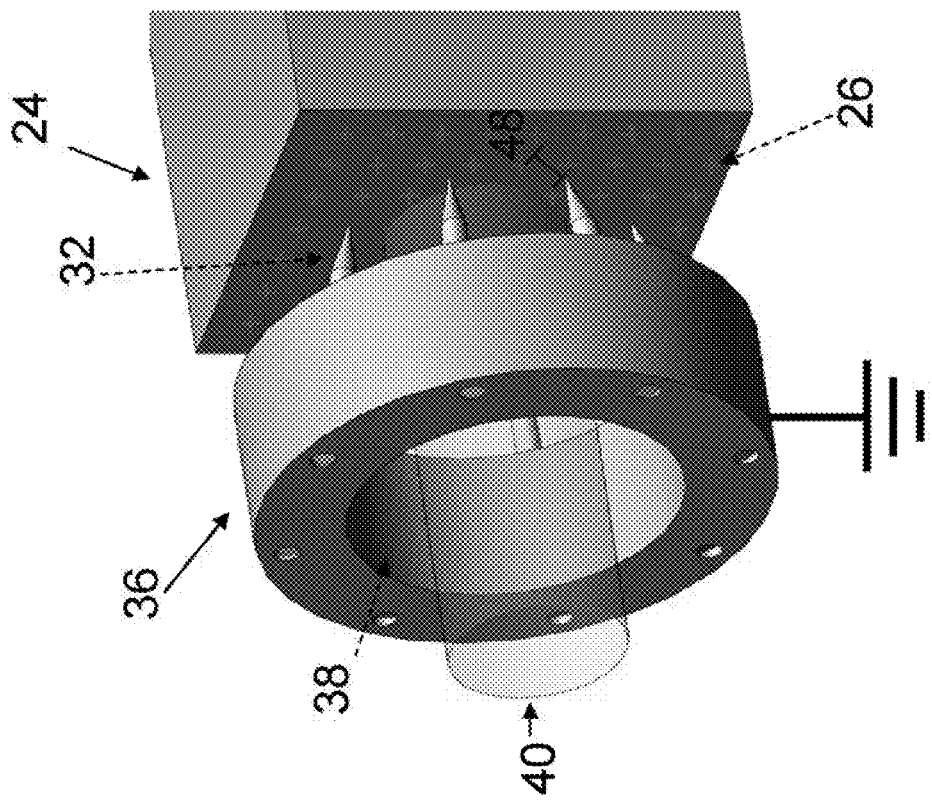
Figure 5a
Figure 5b

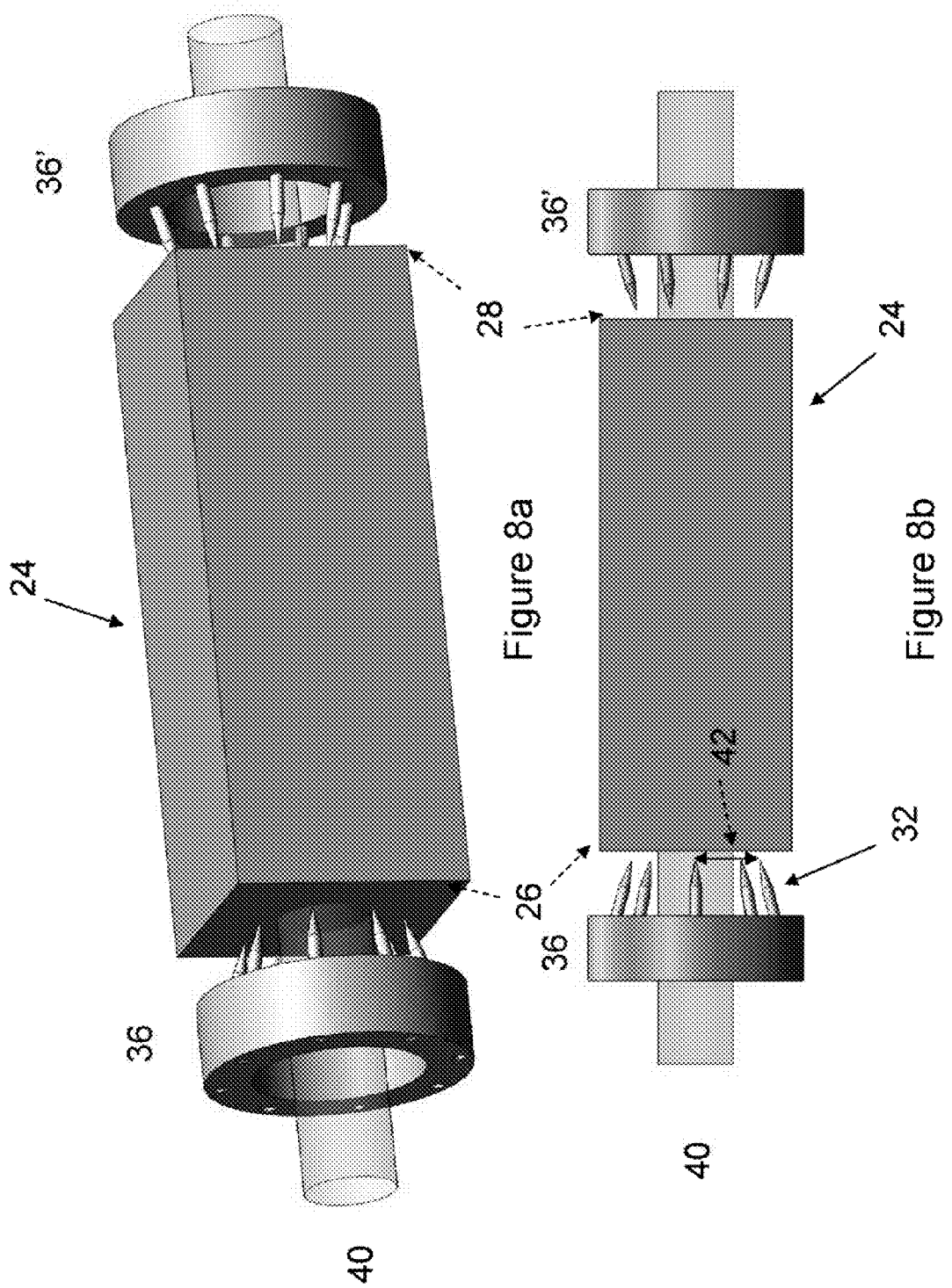

Q-SWITCHED LASER WITH PASSIVE DISCHARGE ASSEMBLY

FIELD OF THE INVENTION

Generally, the present invention relates to lasers. More specifically, the present invention relates to Q-switched lasers comprising optical modulators positioned in close proximity to an adjacent passive discharge assembly, having one or more substantially sharp electrodes, that minimizes prelase.

BACKGROUND OF THE INVENTION

A laser is a device that produces light through the stimulated emission of photons from an active gain medium. Such a device contains an optical cavity or resonator, wherein light circulates between a highly reflective mirror and partially transmissive mirror, which is responsible for the emission of the output laser beam. With each round trip, the circulating light passes through the gain medium that amplifies the circulating light and compensates for resonator losses. In order to amplify the circulating light, the gain medium is "pumped" with an external source of energy such as light (known as optical pumping) or electrical current (known as electrical pumping).

Solid state lasers, wherein the gain medium comprises a ion-doped crystalline solid host (e.g., neodymium-doped yttrium aluminum garnet or Nd:YAG), are desirable for a number of military and civilian applications. Military applications include use as rangefinders, target designators, and illuminators. Civilian applications include spectroscopy, laser surgery, and laser radars. Most of these applications require short-pulse (<=20 ns) operation, wherein the laser output varies with time, as opposed to continuous wave operation, wherein the laser output is relatively constant with time. The advantage of short-pulse operation is that relatively high amounts of energy (e.g., peak power in the gigawatt range) can be concentrated in a given place in as short a time as possible.

Q-switching is a technique for producing energetic short pulses. The term "Q" refers to the Q factor or quality factor, which represents the ratio of energy stored in a resonant cavity to the energy loss per cavity round trip. The Q-switching technique uses a device known as the "Q-switch." The Q-switch increases the resonator losses until such time that the stored energy is sufficient to allow the generation of a high peak power optical pulse. Then, the cavity losses are suddenly reduced. In other words, a Q-switch modulates resonator losses so as to prevent or induce laser output as required. The Q-switch inhibits laser output in the low "Q" (or high-loss) state known as holdoff. When the Q-switch is switched to its high "Q" (or low-loss) mode, the laser is suddenly able to release a substantial fraction of the stored energy in a very short time, producing very high peak powers.

Q-switches comprising optical modulators based on the electro-optic effect are commonly used in short pulse lasers. Such optical modulators have crystals of a suitable material, e.g., lithium niobate ($LiNbO_3$), whose optical properties may be varied in proportion to an applied electric field. However, one drawback of using lithium niobate, or other high surface resistivity crystals, is that they can suffer from surface charging due to temperature changes via the pyroelectric effect or via other means. If the surface charges are not neutralized, then there is loss of holdoff, leading to premature laser output known as prelase. This can adversely affect the performance of the laser and decrease the reliability of laser products containing a Q-switch.

U.S. Pat. No. 4,884,044 to Heywood et al. (reissued as RE 35,240) discloses several methods for neutralizing surface charge induced by the pyroelectric effect including corona discharge, spark gaps, alpha particle emitting radioactive sources, conductive coatings, and a conductive wiper. In a first method, electrodes near the end faces of a crystal are connected to a high voltage power supply. When the power supply is turned on, it generates a stream of ions which neutralizes the surface charge. A drawback of this method is that the power supply associated with the discharge is bulky and prone to electromagnetic interference ("EMI"). A similar drawback is observed in a second disclosed method, wherein ions are generated via a spark discharge near the crystal surfaces. Moreover, the spark discharge erodes the electrodes and causes damaging deposits on the crystal's optical surfaces.

In a third method described in the '044 Patent, a radioactive source, such as an alpha emitter (e.g., Americium 241), is placed near the crystal surfaces. The radioactive source ionizes the air, thereby neutralizing the temperature-induced surface charge. The use of a radioactive source has been the solution of choice for military lasers, but customers demand a non-radioactive method, especially because a vendor is required to set up the infrastructure that is needed to properly control and dispose of the radioactive sources.

In a fourth method described in the '044 Patent, an optically transparent, electrically conductive coating is applied to the crystal surfaces. However, in this passive method, the electrically conductive coatings are historically prone to failure due to laser induced breakdown. In a fifth method, an electrically conducting surface is used to periodically wipe the charge surface like a wiper blade. However, this is a complicated mechanism which is prone to scratch the optical surface. Moreover, these methods require physical contact with crystal surfaces.

Thus, there still remains a need for a compact, non-radioactive, non-contact ionization source that can passively neutralize the surface charge induced by the pyroelectric effect or other means. There also remains the further need for an ionization source that does not interfere with the normal Q-switched operation of a laser beam.

SUMMARY OF THE INVENTION

Embodiments of the invention concern a Q-switched laser apparatus with a passive discharge assembly. The apparatus comprises an optical cavity comprising a pair of reflective surfaces, an active gain medium, an optical pump or electrical pump, and an electro-optic component (e.g., a Q-switch crystal), comprising at least two opposed faces, disposed in an optical path. At least one discharge assembly is positioned proximate to at least one of the at least two opposed faces of the electro-optic component. The discharge assembly comprises at least one electrode pin for neutralizing charge on said at least one face, wherein said electrode pin is positioned outside of the optical path. The discharge assembly is connected either to the ground or, alternatively, to a static source of neutralizing charge.

BRIEF DESCRIPTION OF THE DRAWINGS

In the accompanying drawings, which form a part of the specification and are to be read in conjunction therewith and in which like reference numerals are used to indicate like parts in the various views:

FIG. 5a is a schematic diagram illustrating a single ring of electrodes neutralizing the surface charge generated by a Q-switch crystal, according to an embodiment of the invention, and FIG. 5b is an end view of the apparatus illustrated in FIG. 5a;

FIG. 8a is a schematic diagram illustrating two rings of electrodes that neutralize the surface charge generated by a Q-switch crystal, according to embodiment of the invention, and FIG. 8b is a side view of the apparatus illustrated in FIG. 8a.

DETAILED DESCRIPTION OF EMBODIMENTS OF THE INVENTION

Embodiments of the invention are directed to a passive, non-contact discharge assembly comprising one or more substantially sharp electrode pins that are positioned proximate to a charged, insulating surface, such as the optical entrance and exit surface of a Q-switch crystal, e.g., lithium niobate ($LiNbO_3$). The electrode pins are connected either to the ground or, alternatively, to a static source of neutralizing charge. The purpose of the electrodes is to ionize the air near the tips due to the high electric field generated by the surface charge. The air ions, in turn, neutralize the surface charge as they are attracted to the surface due to the electrical attraction. In the absence of a surface charge, no air ionization occurs. In one embodiment, the electrode pins are located near the Q-switch crystal surface, but outside the path of the laser beam propagating into and out of the Q-switch crystal.

Embodiments of the invention offer a passive method of neutralizing surface charge. The passive discharge assembly does not require an outside power source to operate, only a connection to ground potential, or static source of neutralizing charge. It does not use potentially hazardous materials and does not create damage to any coatings on the crystal surface which may lead to premature failure of the crystal.

Figure 1:
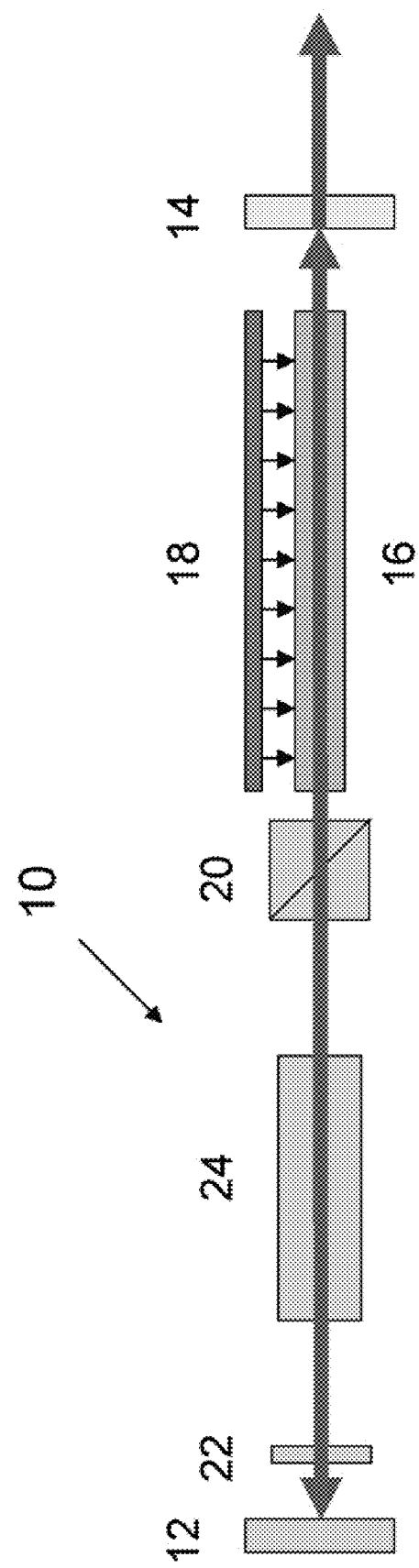
FIG. 1 is a schematic diagram illustrating a conventional Q-switched laser incorporating an optical modulator.

FIG. 1 is a schematic diagram depicting a conventional optical cavity or laser resonator 10, wherein light circulates between a highly reflective mirror 12 and a partially transmissive mirror 14 or output coupler. Mirrors 12, 14 help ensure that light makes many round trips through a laser rod 16, which contains an active gain medium, such as an ion-doped crystalline solid, e.g., Nd:YAG, that amplifies the light. Laser rod 16 is associated with an optical pump source 18, which supplies energy for amplifying the light. Optical pump source 18 may include, but is not limited to, flashlamps, light-emitting diodes and laser diodes. Optical pumping supplies the energy to raise electrons within the active gain medium from a lower energy level to a higher energy level, eventually leading to population inversion, wherein more electrons exist in the higher energy level than the lower energy level.

Laser rod 16 may comprise other active gain media besides Nd:YAG. For instance, other neodymium-doped active gain media may include, but are not limited to, neodymium-doped yttrium orthovanadate (Nd:$YVO_4$), yttrium lithium fluoride (Nd:YLF), glass (Nd:glass). Other active gain media include, but are not limited to titanium-doped sapphire ($Ti^{3+}$:sapphire), chromium-doped alexandrite ($Cr^{3+}$:$BeAl_2O_3$), chromium-doped ruby ($Cr^{3+}$:$Al_2O_3$), ytterbium-doped YAG (Yb:YAG), erbium-doped YAG (Er:YAG) and glass (Er:glass), and holmium-doped YAG (Ho:YAG). Laser rod 16 may comprise active gain media suitable for gas lasers including, but not limited to, carbon dioxide ($CO_2$), hydrogen fluoride (HF), and deuterium fluoride (DF).

A polarizer 20 is inserted in the cavity between highly reflective mirror 12 and laser rod 16. Polarizer 20 either transmits or reflects the laser light depending on the polarization state of the laser light. A quarter wave plate 22 is placed next to highly reflective mirror 12 within laser resonator 10. Generally, a wave plate is an optical device that alters the polarization state of a light wave by producing a phase shift between orthogonal components of the light wave. A quarter wave plate produces a phase shift of one quarter wavelength and can change linearly polarized light into circularly polarized light and vice versa.

If the optic axis of quarter wave plate 22 is oriented parallel or perpendicular to the transmission axis of polarizer 20, the polarization state reflects from mirror 12 unchanged and is transmitted through polarizer 20 back into laser rod 16. In this high "Q" (low loss) state, a resonate mode can form due to light emitted from the laser material resulting in the formation of a laser beam in resonator 10. However, if optic axis of the quarter wave plate 22 is oriented at 45 degrees with respect to the transmission axis of polarizer 20, light transmitted through quarter wave plate 22 towards highly reflective mirror 12 is converted into circularly polarized light of a particular orientation (either right handed or left handed). Upon reflection from mirror 12, the circular polarization orientation is opposite to the beam incident on mirror 12, i.e., if the beam is right handed circularly polarized before mirror 12, it is left handed circularly polarized upon reflection. When the reflected beam passes back through quarter wave plate 22 towards polarizer 20, it is converted back to linear polarization, but in a state perpendicular to the transmission axis of the polarizer. Consequently, when the beam reaches polarizer 20, it is reflected instead of transmitted. This is the low "Q" (high loss) state known as holdoff. In this state, a resonate mode cannot form in the laser cavity since the total losses always exceed the laser gain.

The insertion of a Q-switch crystal 24, such as lithium niobate ($LiNbO_3$), between quarter wave plate 22 and polarizer 20 allows the device to be switched from a low Q state to a high Q state. This is achieved via the linear electro-optic effect, or Pockcels effect, in crystal 24, wherein an applied electric field modifies its refractive index in linear proportion to the strength of the electric field. In particular, the application of a voltage to crystal 24 transverse to the propagation direction essentially turns crystal 24 into a variable waveplate. Crystal 24 can be switched from a zero waveplate to a quarter waveplate in less than a nanosecond with the appropriate voltage. Consequently, there is a resultant change in the polarization state of the light beam traveling through Q-switch crystal 24 such that it is transmitted by polarizer 20 that is also in the beam path.

In addition to lithium niobate, other suitable Q-switch crystal materials include, but are not limited to, lithium tantalate ($LiTaO_3$), potassium di-deuterium phosphate (KD*P), β-barium borate (BBO), potassium titanyl phosphate (KTP), gallium arsenide (GaAs), rubidium titanyl phosphate (RTP) and indium phosphide (InP). In an alternative embodiment, Q-switch crystal 24 can be replaced with custom-designed poled organic polymers that also exhibit the electro-optic effect.

Figure 2:
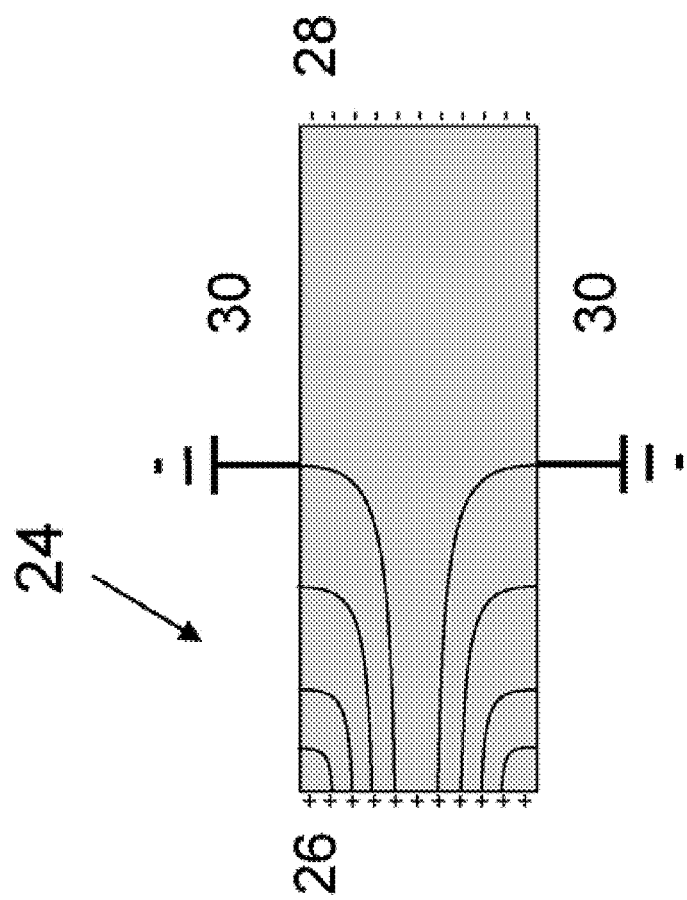
FIG. 2 is a schematic diagram illustrating the induction of surface charges on a conventional Q-switch crystal.

A drawback of high-resistivity Q-switch crystals such as lithium niobate is that they are sensitive to temperature changes. FIG. 2 schematically illustrates the development of temperature-induced surface charge on a conventional high resistivity Q-switch crystal 24 via the pyroelectric effect. The pyroelectric effect is a phenomenon wherein changes in the crystal's temperature induce the development of static electric charges of opposite polarity at opposite surfaces of the crystal. The surface charging occurs in the plane perpendicular to the optic axis of Q-switch crystal 24, which is also the laser beam propagation axis of crystal 24. As a consequence of the pyroelectric effect, the potential difference between an optical entrance 26 and an exit 28 surface can increase at the rate of ~4.5 kV/C for a 25 mm long lithium niobate crystal. An electric field is set up between entrance and exit surfaces 26, 28 as well as transverse electrode surfaces 30 as shown in FIG. 2. Entrance surface 26 develops a positive charge and exit surface 28 develops a negative charge as shown in FIG. 2. The transverse portion of the field couples to the electro-optic effect and can cause crystal 24 to act as an internally generated waveplate in the absence of an applied voltage. The result of this internally generated waveplate is a lack of holdoff or prelase, which is the premature release of laser energy.

In addition to the pyroelectric effect, surface charging of Q-switch crystal 24 can occur by other means including the piezoelectric effect. The piezoelectric effect is a phenomenon wherein a material such as Q-switch crystal 24 develops an electric potential in response to mechanical stress.

Due to the high potential difference created over a few degrees, the internally generated waveplate can last for many hours without an outside mechanism for charge neutralization. In other words, Q-switch crystals, such as pure lithium niobate crystals, will retain a surface charge, in the absence of mitigating factors, for hours or even days, which can adversely affect the electro-optic effect. The electrical properties of Q-switch crystals 24 are responsible for the build-up and maintenance of the surface charges. With respect to lithium niobate, its bulk resistivity is approximately $4 \times 10^{14}$ $\Omega$cm, which can adversely lead to the development of surface charges. A 9×9×25 mm crystal with the electrodes applied to opposing 9×25 surfaces will have a capacitance of ~20 pf. The neutralization of Q-switch crystal 24 is analogous to the charge and discharge cycle of a resistor-capacitor (RC) circuit, and the RC time constant (i.e., the product of the Q-switch crystal's resistance and capacitance values) for free internal charge to migrate to the charged surface for self-neutralization can be, for example, ~2.7 hours (1/e), thus prolonging the time for self-neutralization. Impurities, or the lack thereof, in lithium niobate crystals may lead to variations in the RC time constant. Other factors, such as a free internal charge's migration path through Q-switch crystal, may also affect the RC time constant value.

Embodiments of the invention utilize the surface charge on Q-switch crystal 24 to generate a relatively high electric field around at least one relatively sharp point, such as the tip of an electrode, proximate to charged surface 26, 28 of Q-switch crystal 24. The electrode is connected to ground or the system zero potential point, or, alternatively to a static source of neutralizing charge including, but not limited to, a battery, a DC generator, a charged capacitor, and the like. This may create a corona discharge near the sharp tip, which in turn will assist in the neutralization of the surface charge. A corona discharge is an electrical discharge, induced by the ionization of a fluid such as air, which occurs at points of high electrical stress, such as a relatively sharp tip. Without being bound by any theory, it is believed that the sharp cylindrical tip of the electrode is advantageous because it allows the concentration of electrons, thereby facilitating corona discharge. See Brian S. Elliott, *Electromechanical Devices & Components Illustrated Sourcebook*, p. 277 (2007). In an alternate embodiment of the invention, the inventive Q-switched laser apparatus may operate in other gases besides ambient air such that a corona discharge may be induced by the ionization of other gaseous fluids including, but not limited to, nitrogen ($N_2$) and noble gases, i.e., helium (He), neon (Ne), argon (Ar), krypton (Kr), xenon (Xe), and radon (Rn). Preferably, fluids with a low ionization energy are utilized.

Figure 3:
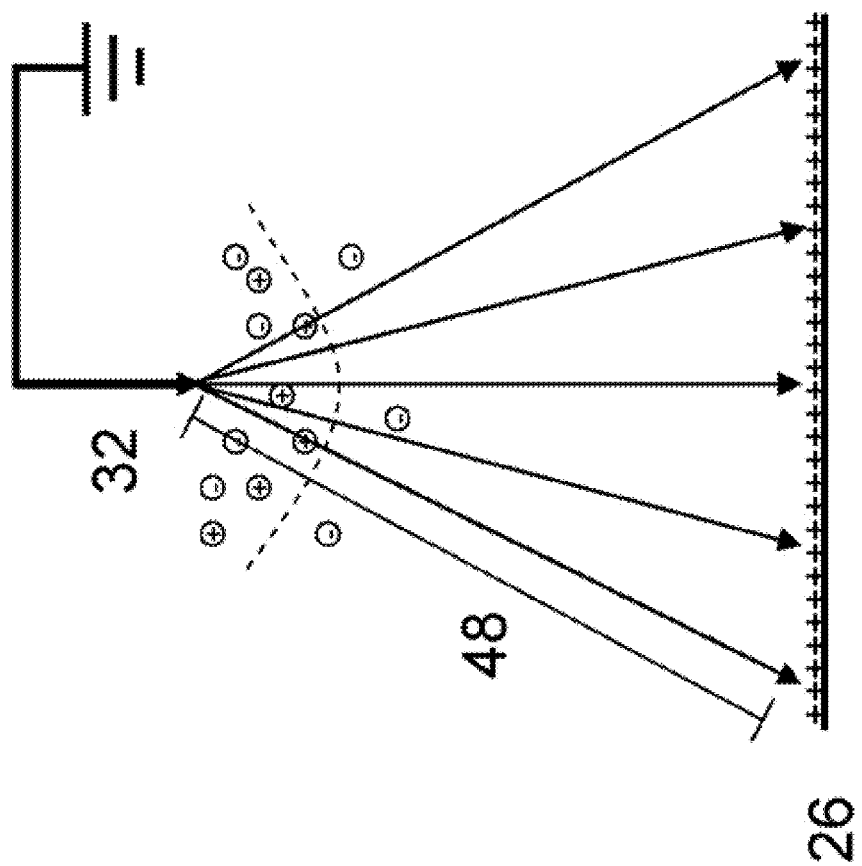
FIG. 3 is a schematic diagram illustrating a single electrode neutralizing the surface charge generated by a Q-switch crystal, according to an embodiment of the invention.

FIG. 3 illustrates a first embodiment, wherein a single electrode pin 32 with a sharp tip is located near charged surface 26 of Q-switch crystal 24, or alternatively, the charged surface of a crystal for surface acoustic wave devices. As the temperature of Q-switch crystal 24 changes, the surface electric charge of the pyroelectric crystal also increases. The electric field strength at the tip of electrode pin 32 increases until it exceeds a threshold level, which for this embodiment is about 30 kV/cm, which is the breakdown electric field strength for air, or the threshold value, at standard temperature and pressure, needed for freeing bound electrons from the tip of electrode pin 32. As this threshold is passed, the air surrounding the electrode tip is ionized. The ions, which are charged opposite to surface charge 26, are attracted to the surface and combine with the surface charge to neutralize it. Although the breakdown electric field strength for air is 30 kV/cm at standard temperature and pressure, that threshold value will be different for other gases, temperatures, or pressures.

Figure 4:
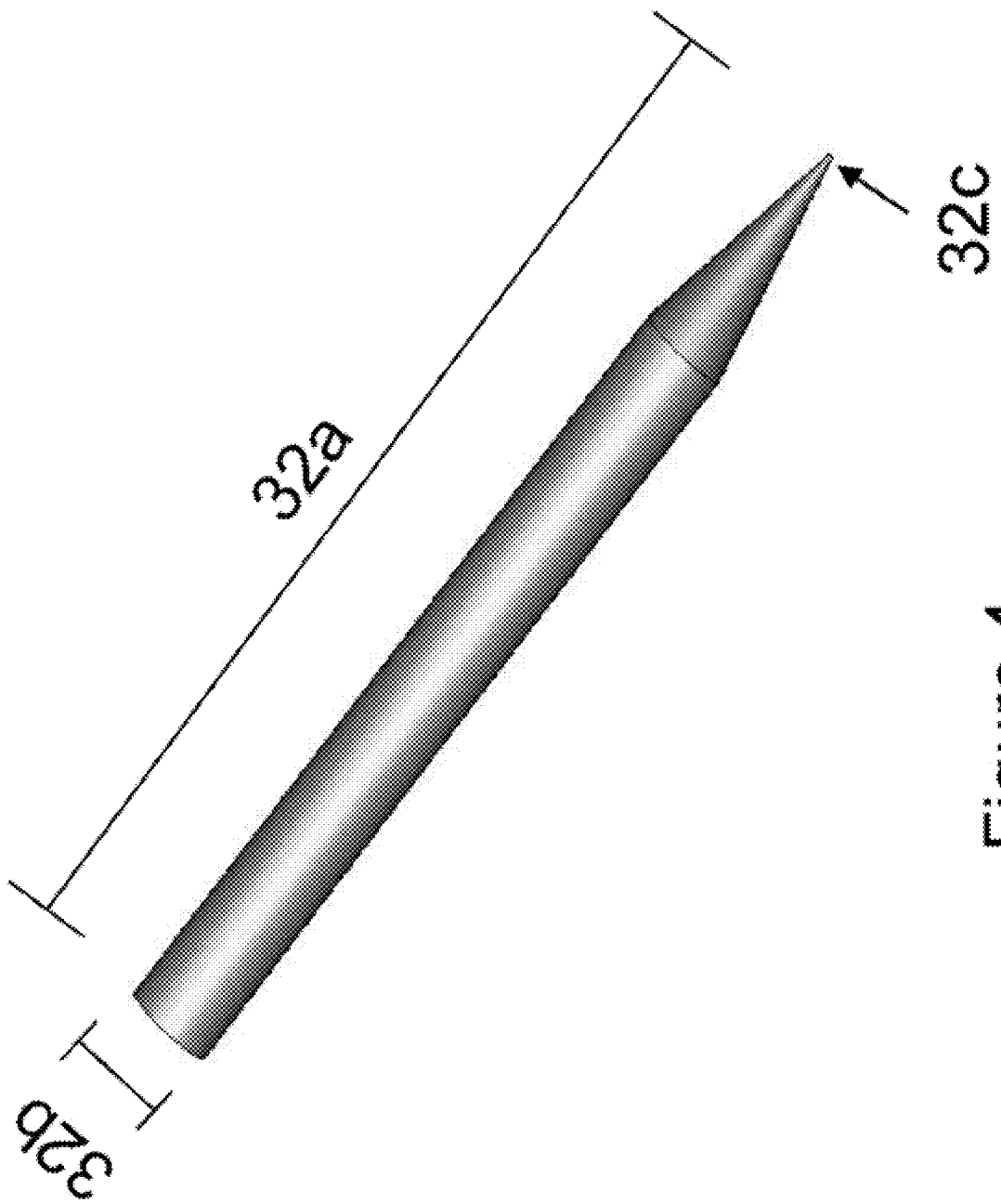
FIG. 4 is a schematic diagram illustrating an electrode pin used according to an embodiment of the invention.

FIG. 4 illustrates one exemplary electrode pin 32 in further detail. Preferably, electrode pin 32 is made from a low work function material such as tungsten. The work function is "the minimum energy needed to release a free electron from the surface of the material." John Ball and Adrian Moore, *Essential Physics for Radiographers*, p. 160 (1997). The tungsten can be thoriated tungsten, or, pure tungsten. The use of a low work function material in electrode 32 facilitates the establishment of corona discharge, because a relatively low amount of energy is necessary for the release of electrons from electrode 32.

Electrode pin 32 has a length 32a and overall diameter 32b that are determined by geometrical constraints, and, as such, can have any compatible dimensions. By way of example, and without limitation, length 32a may be between about 0.50 inches to about 1.00 inches, preferably between about 0.50 inches to about 0.95 inches, or more preferably between about 0.50 inches to about 0.85 inches. Likewise, diameter 32b may be between about 0.010 inches to about 0.020 inches, preferably between about 0.010 inches to about 0.015 inches, or more preferably between about 0.010 inches to about 0.012 inches. Electrode pin 32 has a tip 32c with a diameter that produces an electric field strength greater than about 30 kV/cm, such as a diameter of less than about 20 microns, preferably less than about 10 microns, and more preferably less than about 6 microns. However, tip 32c may have diameters greater than about 20 microns if the stored electric charge on the crystal is sufficiently high. The lengths and diameters of electrode pin 32 may be adjusted depending on manufacturing requirements as well as the different gases that they are used with.

FIGS. 5a and 5b illustrate a second embodiment of the invention, wherein a grounded ring 36, comprising a number of electrodes pins 32, e.g., eight electrode pins, is positioned adjacent to charged surface 26 of Q-switch crystal 24, but outside of an optical path 38. Ring 36 is preferably made of aluminum or other suitable highly conductive material (e.g., copper, tungsten, gold, or silver), and can have a circular, square, rectangular, or arbitrary shape. Although eight electrodes 32 are illustrated in ring 36, the number of electrodes pins 32 may range from 1 to 16, preferably from 1 to 8, and more preferably from 1 to 4. The minimum distance of ring 36 from Q-switch crystal 24 is variable, and can be any suitable distance so long as the presence of grounded ring 36 interferes with Q-switch crystal 24 by modifying the internally applied electric field. If ring 36 is made from a metal, it electrically connects the electrodes together. If ring 36 is made of an insulating material and the electrodes are grounded in some other manner (e.g., electrodes are grounded by a solder wire at the base, which connects the electrodes together) then there is no minimum distance so long as grounded ring 36 does not modify the internally applied electric field. A plurality of rings 36, each with one or more electrode pins 32, can be used to neutralize charged surface 26.

A laser beam 40 propagates through the center of ring 36 and the center of charged surface 26 of Q-switch crystal 24. Distance 42 represents the spacing of electrode pins 32 relative to the center of laser beam 40, and it is adjusted so that beam 40 can pass through electrode ring 36 without any portion of the beam being blocked by electrode pins 32. Embodiments of the invention have a distance 42 with a value of about 3-10 mm, preferably about 4-8 mm, and more preferably about 5-6 mm. Preferably, distance 42 is a distance D that is at least about 1.5 times the half-width of laser beam 40.

Figure 6:
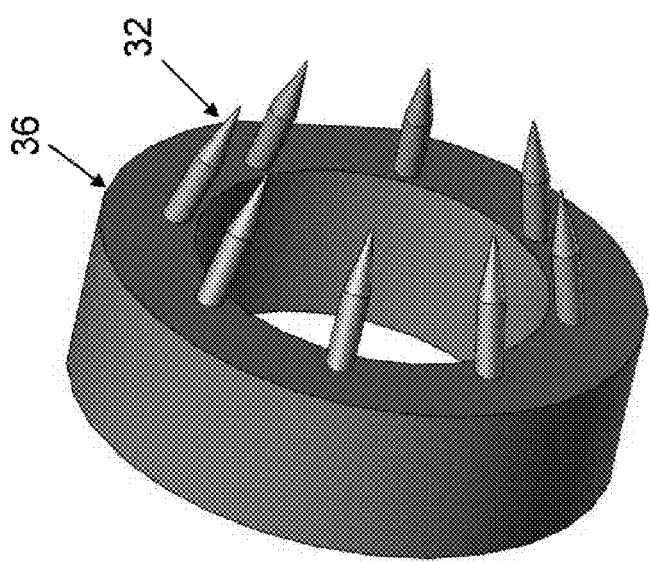
FIG. 6 illustrates one configuration of a ring of electrodes used according to an embodiment of the invention.

FIG. 6 illustrates a configuration of ring 36 comprising electrode pins 32. Electrode pins 32 form an acute angle (i.e., between about 0° to about 90°, preferably between about 15° to about 60°, and more preferably between about 30° to about 45°) so as to lessen the distance 42. The angle is measured between the longitudinal axis of electrode pin 32 and a surface of ring 36. One of ordinary skill in the art will recognize that electrode pins 32 may form other angles such as a right angle, i.e., about 90°, or an obtuse angle, i.e., from about 90° to about 180°.

Figure 7:
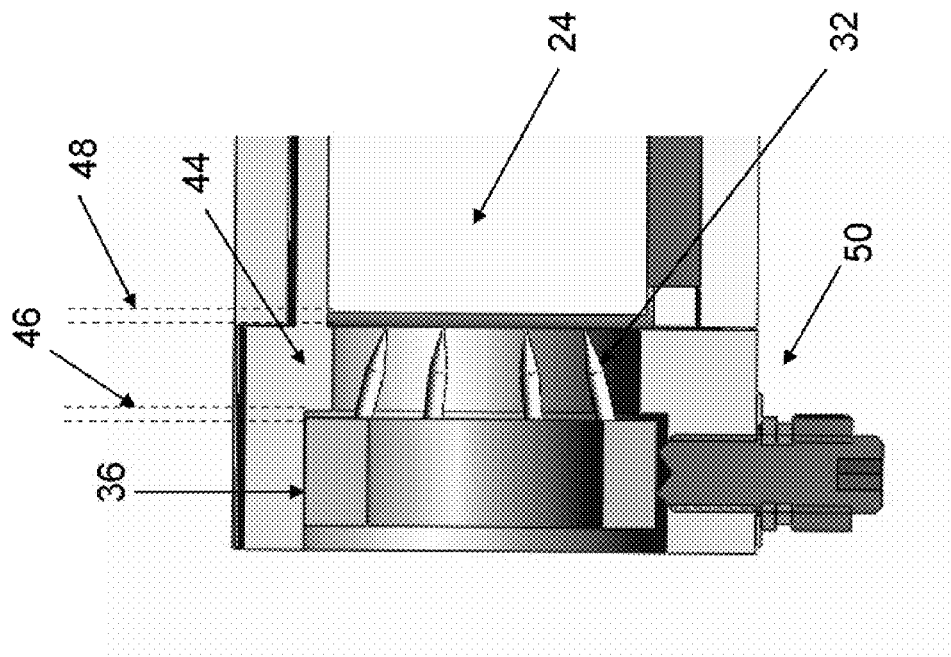
FIG. 7 is a cross-sectional view illustrating a housing containing a ring of electrodes and a Q-switch crystal according to an embodiment of the invention.

FIG. 7 illustrates an assembled discharge assembly comprising two components i.e., ring 36 and electrode pins 32, within a housing 44. The discharge assembly may be tack bonded to housing 44 using a suitable adhesive, preferably a suitable polyurethane, non-outgassing adhesive. A grounding strap 50 is used to ground ring 36. Q-switch crystal 24 is preferably centered within housing 44 so that a distance 48, between electrode pins 32 and the face of crystal 24, is substantially equidistant for each electrode pin 32. Moreover, electrode pins 32 are flush with the edge of housing 44 such that distance 48 may range between about 0.001 inches to about 0.018 inches, preferably between about 0.005 inches to about 0.017 inches, or more preferably between about 0.010 inches to about 0.016 inches. A gap 46 allows electrode pins 32 to move further forward to vary distance 48 if necessary, and it has a length less than about 0.009 inches, preferably less than about 0.008 inches, and more preferably less than about 0.007 inches. Distance 48 is also indicated on FIGS. 3 and 5a. A gas other than air can be stored within housing 44, as shown.

In an alternative embodiment, in lieu of a discharge assembly comprising ring 36 with electrode pins 32, the discharge assembly may have alternate structural configurations such as a cone, a truncated cone, a pyramid, a truncated pyramid, or any suitable shape designed to create a corona discharge induced by the ionization of a fluid. In another embodiment, the discharge assembly may comprise a grounded ring 36 with two or more rows of electrode pins 32.

FIGS. 8a and 8b illustrate another embodiment, wherein rings 36, 36' each with electrode pins 32 are respectively positioned adjacent to charged surfaces 26, 28 of Q-switch crystal 24. Laser beam 40 propagates through the center of two rings 36, 36' and the center of charged surfaces 26, 28 of Q-switch crystal 24. Distance 42 is adjusted so that beam 40 can pass through electrode rings 36, 36' without any portion being blocked by electrodes pins 32. This allows discharge of surfaces 26, 28 of Q-switch crystal 24. The spacing of pins 32, relative to both the face of crystal 24 (i.e., distance 48) and the center of the laser beam 40 (i.e. distance 42), is comparable to the dimensions noted above in connection with the second embodiment.

In an alternate embodiment, two or more passive discharge assemblies, each comprising ring 36 with electrode pins 32, may be placed proximate to charged surface 26, 28 of Q-switch crystal 24. In another alternate embodiment, Q-switch crystal 24 may have a complex geometry comprising multiple faces. In such cases, a passive discharge assembly, comprising ring 36 with electrode pins 32, may be positioned adjacent to each face of Q-switch crystal 24.

An experiment was conducted to test whether the passive discharge assembly, comprising a ring 36 with electrode pins, maintains holdoff and prevents prelase over a range of operating temperatures for a laser apparatus. More specifically, measurements were taken of contrast ratio over time with varying temperatures. The contrast ratio is a value expressing the amount of laser energy entering into a system to the amount of laser energy leaking out of a system. So for instance, an initial contrast ratio of about 300/1 at room temperature (about 25° C.), represents the fact that if about 1 mW of laser energy is emitted by laser beam then only about 0.003 mW of laser energy leaks out of thermal chamber. Preferably, in order to prevent prelase, the contrast ratio should be above a laser's prelase threshold.

In the experiment, the contrast ratio was measured for (i) an inventive system, comprising passive discharge assemblies positioned adjacent to a Q-switch crystal, over a period of about 220 minutes, and (ii) a comparative system, comprising only a Q-switch crystal but no passive discharge assemblies, over a period of 260 minutes. The contrast ratio was measured in three intervals. In a first 120 minute interval for both systems, the contrast ratio was measured as air temperature was gradually decreased at the rate of about 1 C/min from about +80 C to −40 C. In a second interval, the contrast ratio was measured as the air temperature was held constant at about −40 C for either 40 minutes (for the inventive system) or 60 minutes (for the comparative system). In a third 60 minute interval for both systems, the contrast ratio was measured as the air temperature was gradually increased at the rate of about 1 C/min from about −40 C to +20 C.

For the inventive system, the experimental results indicated that prelasing did not occur over the range of operating temperatures. The contrast ratio values were especially good at elevated temperatures and acceptable at about −40 C. However, for the comparative system, the experimental results indicating that prelasing did occur over a substantial portion of the operating temperature range. Thus, the results indicated that the inventive passive discharge assembly can prevent prelase over a range of operating temperatures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A Q-switched laser apparatus, comprising:
   an optical cavity comprising a pair of reflective surfaces;
   an active gain medium;
   an optical pump or electrical pump;
   an electro-optic component, comprising at least two opposed faces, disposed in an optical path; and
   at least one grounded discharge assembly proximate to at least one of the at least two opposed faces of the electro-optic component, wherein the discharge assembly comprises at least one electrode pin for neutralizing charge on said at least one of the at least two opposed faces, and wherein said electrode pin is positioned outside of the optical path,
   wherein said at least one electrode pin is spaced apart from said at least one of the at least two opposed faces and wherein the at least one grounded discharge assembly is unpowered.

2. The Q-switched laser apparatus of claim 1, wherein at least one of the at least one grounded discharge assembly is proximate to each face of the electro-optic component.

3. A Q-switched laser apparatus, comprising:
   an optical cavity comprising a pair of reflective surfaces;
   an active gain medium;
   an optical pump or electrical pump;
   an electro-optic component, comprising at least two opposed faces, disposed in an optical path; and
   at least one grounded discharge assembly proximate to at least one of the at least two opposed faces of the electro-optic component, wherein the discharge assembly comprises at least one electrode pin for neutralizing charge on said at least one of the at least two opposed faces, and wherein said electrode pin is positioned outside of the optical path, wherein the at least one grounded discharge assembly comprises a ring with a plurality of electrode pins.

4. The Q-switched laser apparatus of claim 1, wherein the active gain medium is selected from the group consisting of neodymium-doped yttrium aluminum garnet (Nd:YAG), neodymium-doped yttrium orthovanadate (Nd:YVO$_4$), neodymium-doped yttrium lithium fluoride (Nd:YLF), neodymium-doped glass (Nd:glass), titanium-doped sapphire (Ti$^{3+}$:sapphire), chromium-doped alexandrite (Cr$^{3+}$:BeAl$_2$O$_3$), chromium-doped ruby (Cr$^{3+}$:Al$_2$O$_3$), ytterbium-doped YAG (Yb:YAG), erbium-doped YAG (Er:YAG), erbium-doped glass (Er:glass), and holmium-doped YAG (Ho:YAG).

5. The Q-switched laser apparatus of claim 1, wherein the active gain medium is selected from the group consisting of carbon dioxide (CO$_2$), hydrogen fluoride (HF), and deuterium fluoride (DF).

6. The Q-switched laser apparatus of claim 1, wherein the electro-optic component is selected from the group consisting of lithium niobate (LiNbO$_3$) and lithium tantalate (LiTaO$_3$).

7. The Q-switched laser apparatus of claim 1, wherein the electrode pin has a substantially sharp tip with a diameter of less than about 20 microns.

8. The Q-switched laser apparatus of claim 1, wherein the electrode pin is comprised of tungsten.

9. The Q-switched laser apparatus of claim 1, wherein the Q-switched laser apparatus exhibits a contrast ratio higher than a prelase threshold, wherein the contrast ratio is a value expressing the amount of laser energy entering into a system to the amount of laser energy leaking out of the system.

10. The Q-switched laser apparatus of claim 3, wherein the electrode pins form an angle between about 0° and 90° with one of the at least two opposed faces.

11. The Q-switched laser apparatus of claim 3, wherein the electrode pins are located at a distance D from the center of a laser beam propagating through the ring and the electro-optic component, wherein distance D is at least about 1.5 times the laser beam's half-width.

12. The Q-switched laser apparatus of claim 3, wherein the ring is made from a conductive material selected from the group consisting of aluminum, copper, tungsten, gold, and silver.

13. The Q-switched laser apparatus of claim 2, wherein the at least one grounded discharge assembly comprises a ring with a plurality of electrode pins.

14. The Q-switched laser apparatus of claim 1, wherein the electrode pins are located at a distance D from the center of a laser beam propagating through the electro-optic component, wherein distance D is at least about 1.5 times the laser beam's half-width.

15. The Q-switched laser apparatus of claim 1, wherein a non-outgassing adhesive is interposed between the at least one grounded discharge assembly and a housing of the at least one grounded discharge assembly.

16. A Q-switched laser apparatus, comprising:
   an optical cavity comprising a pair of reflective surfaces;
   an active gain medium;
   an optical pump or electrical pump;
   an electro-optic component, comprising at least two opposed faces, disposed in an optical path; and
   at least one discharge assembly proximate to at least one of the at least two opposed faces of the electro-optic component, wherein the discharge assembly comprises at least one electrode pin for neutralizing charge on said at least one of the at least two opposed faces, wherein said electrode pin is positioned outside of the optical path and is spaced apart from said at least one of the at least two opposed faces, wherein a surface charge on said at least one of the at least two opposed surfaces generates an electric field around an end of said electrode pin, and wherein the discharge assembly is connected to a source of static charge or to a ground.

17. The Q-switched laser apparatus of claim 16, wherein at least one of the at least one discharge assembly is proximate to each face of the electro-optic component.

18. A Q-switched laser apparatus, comprising:
   an optical cavity comprising a pair of reflective surfaces;
   an active gain medium;
   an optical pump or electrical pump;
   an electro-optic component, comprising at least two opposed faces, disposed in an optical path; and
   at least one discharge assembly proximate to at least one of the at least two opposed faces of the electro-optic component, wherein the discharge assembly comprises at least one electrode pin for neutralizing charge on said at least one of the at least two opposed faces, wherein said electrode pin is positioned outside of the optical path and wherein the discharge assembly is connected to a source of static charge, wherein the at least one discharge assembly comprises a ring with a plurality of electrode pins.

19. The Q-switched laser apparatus of claim 16, wherein the source of static charge is selected from the group consisting of a battery, a DC generator, and a charged capacitor.

* * * * *